Nov. 19, 1957　　　H. NERWIN　　　2,813,469
PHOTOGRAPHIC CAMERA
Filed Sept. 23, 1953　　　　　　3 Sheets-Sheet 1
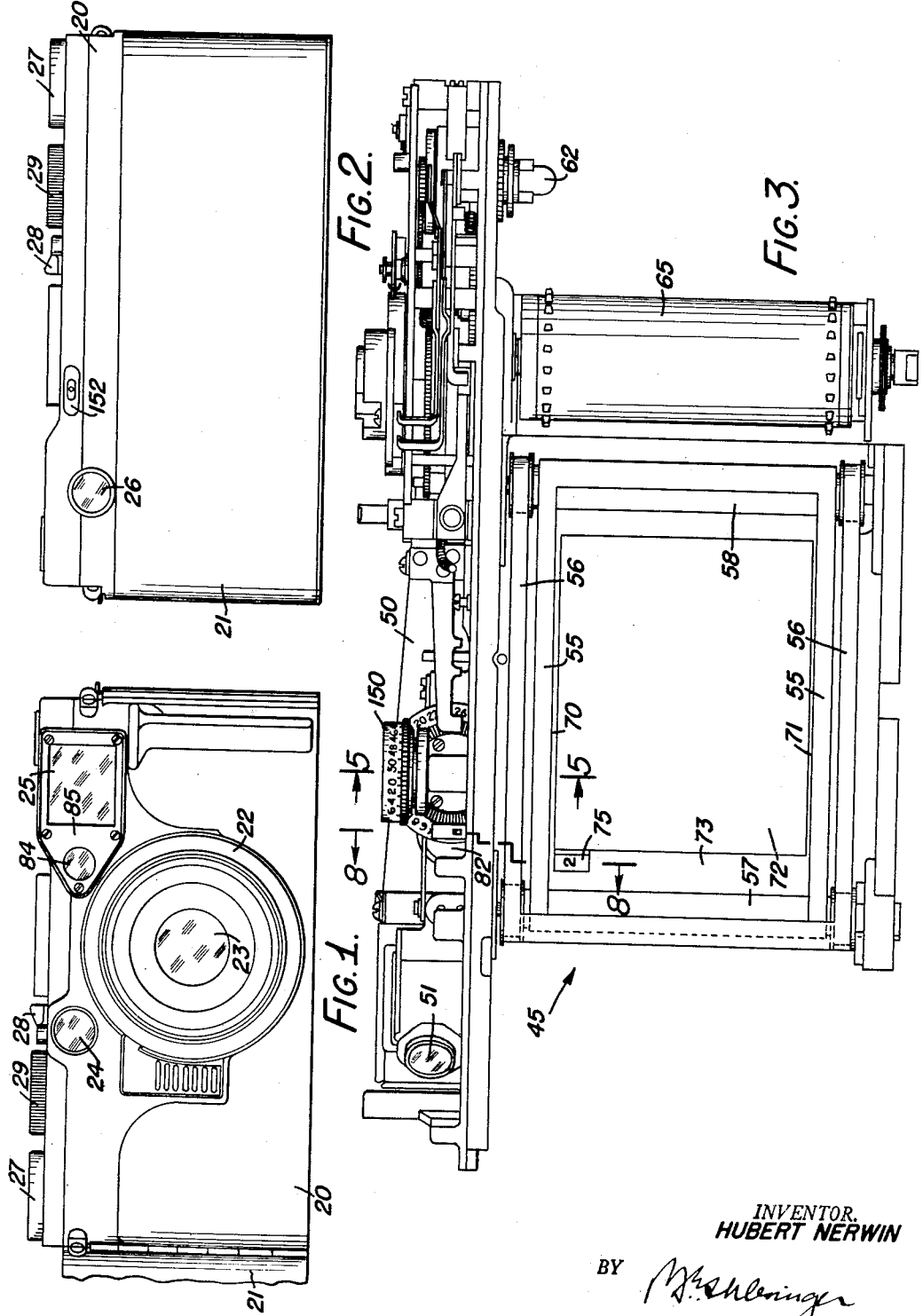
INVENTOR.
HUBERT NERWIN
BY
ATTORNEY

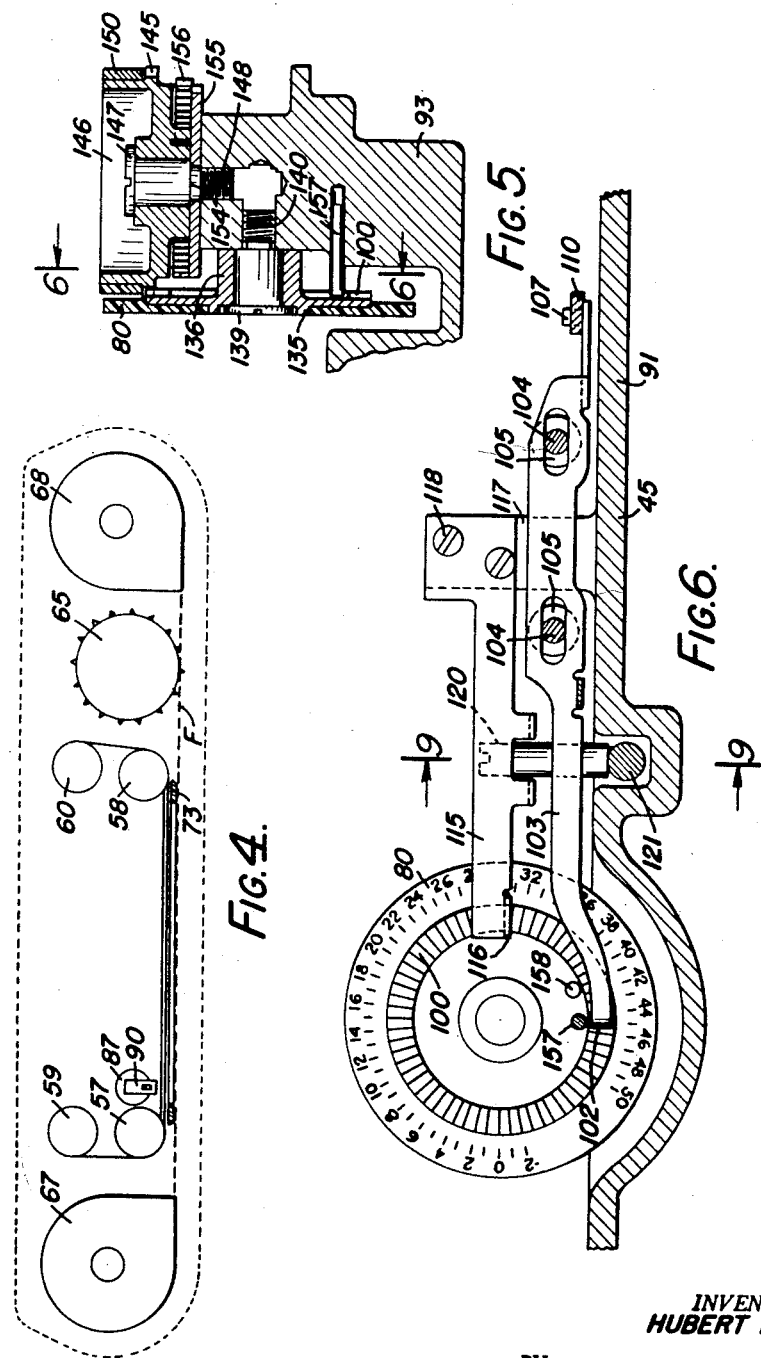

Nov. 19, 1957  H. NERWIN  2,813,469
PHOTOGRAPHIC CAMERA
Filed Sept. 23, 1953  3 Sheets-Sheet 3
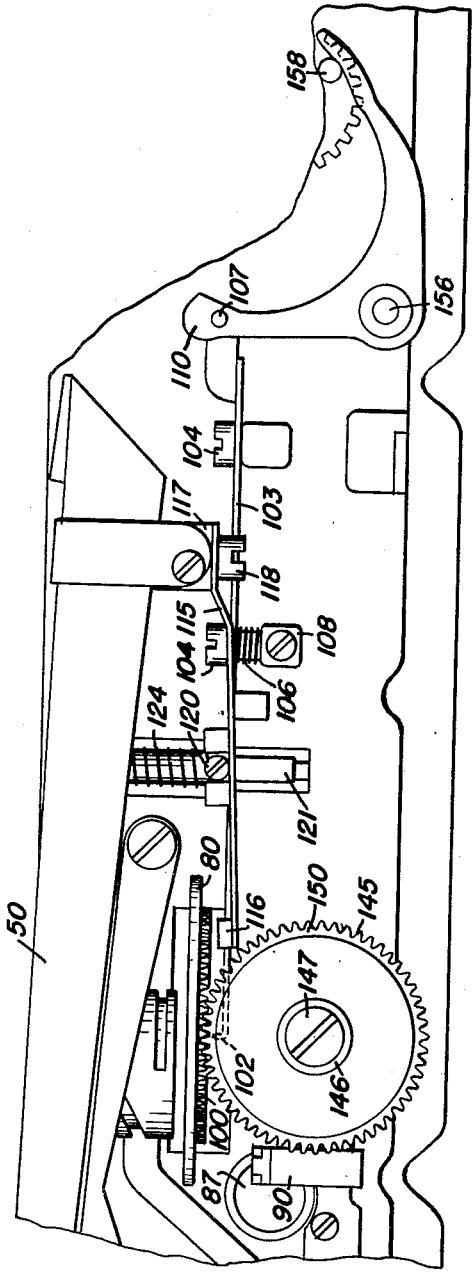
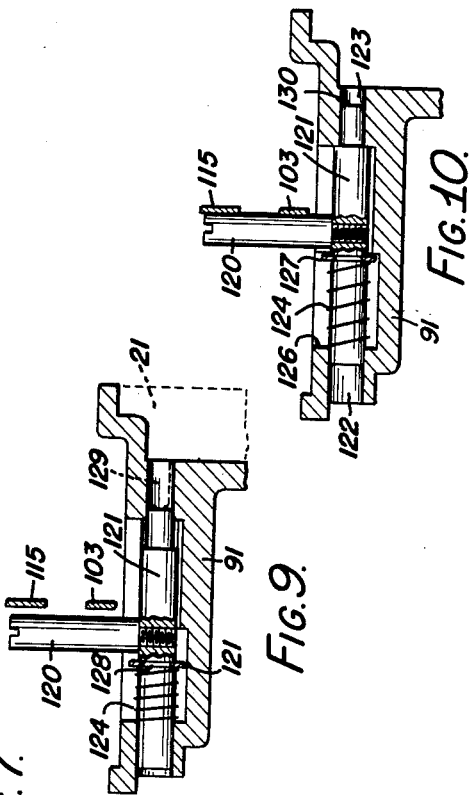
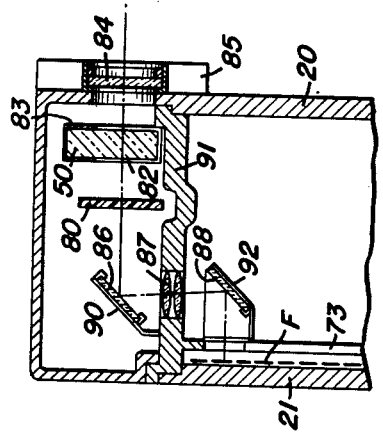
INVENTOR.
HUBERT NERWIN
BY
ATTORNEY United States Patent Office 2,813,469
Patented Nov. 19, 1957

2,813,469

PHOTOGRAPHIC CAMERA

Hubert Nerwin, Irondequoit, N. Y., assignor to Graflex, Inc., Rochester, N. Y., a corporation of Delaware Application September 23, 1953, Serial No. 381,797

2 Claims. (Cl. 95—1.1)

The present invention relates to photographic cameras and more particularly to exposure counters and negative identifiers for photographic cameras. More specifically, the present invention relates to an exposure counter and a photographic negative identifier which may be employed on an automatic roll-film camera such as disclosed in my pending applications Serial Nos. 288,511, now Patent No. 2,719,454, 291,441, 318,231, 352,768, and 365,021 filed May 17, 1952, June 3, 1952, November 1, 1952, May 5, 1953, and June 30, 1953, respectively.

Anyone, who takes pictures of unfamiliar scenes or unfamiliar persons, finds not infrequently, after the film has been developed, that it is difficult to identify the persons or the scenes depicted in the pictures which he has taken. Different proposals have been made in the past for enabling an indicia to be placed on a negative at the time a picture is taken, which will give that negative an identifying number or other mark so that if the photographer makes proper notes at the time of taking of the picture he can subsequently readily identify the picture. In some cases, the camera is so constructed that the photographer can himself mark the film manually with a marking device at the time of or immediately after taking the picture. These have not proved entirely satisfactory for sometimes the film is fogged in the marking operation, or the photographer forgets to mark the film, or he loses the marking device. In the case of removable film holders, holders have been made with recesses to receive removable numbering tabs, but obviously such an arrangement is not suitable for roll film. Efforts to provide means for automatically marking roll film negatives at the time of picture taking have heretofore not proved entirely satisfactory. Where a negative identifying mechanism is provided in a roll film camera it is necessary to provide a counter mechanism also so that the photographer will know the number of the exposure which he has taken and thereby be able to make a note identifying that exposure. Heretofore combined counter and negative identifier mechanisms have been complicated in structure or unreliable.

One object of the present invention is to provide an automatic mechanism for marking automatically on a negative the number of the exposure or some other identifying indicia, at the time that the exposure is made, which will be simple and compact, and require few parts.

Another object of the invention is to provide means for identifying a photographic negative by automatically photographing the number of the exposure on the negative at the time of exposure.

Another object of the invention is to provide a photographic negative identifying mechanism which is coupled to an exposure counter in such way as to be advanced simultaneously with the exposure counter, after such exposure, so that the photographer will readily be able to see the number of the exposure being made, and so that the negative identifier will also be properly positioned to indicate on the next negative exposed the proper number thereof corresponding to the number visible on the exposure counter.

Another object of the invention is to provide a negative identifying device which is automatically advanced after each exposure to permit successive numbers to be photographed successively on successive exposures thereby to identify successively exposed negatives and which is coupled to a graduated counter, that is visible to the photographer, in such way as to advance the counter, so that the photographer may readily ascertain at any time at a glance the number of exposures which he had made on a roll of film, the number of exposures left on the roll, and the number of the particular picture on that roll that is next to be taken.

Still another object of the invention is to provide a combined exposure counter mechanism and negative-identifying mechanism, which is automatically reset when the back of the camera is opened for removal of the exposed film.

Other objects of the invention will be apparent hereinafter from the specification and from the recital of the appended claims.

In the drawings:

Fig. 1 is a front elevation of a camera having therein an exposure counter and a negative-identifying mechanism constructed according to one embodiment of this invention;

Fig. 2 is a rear view of this camera;

Fig. 3 is an enlarged view of the removable chassis which supports the shutter mechanism, the film transport mechanism, elements of the rangefinder and viewfinder system, the exposure counter, and the negative identifying mechanism of the camera;

Fig. 4 is a more or less diagrammatic view showing the relationship of the shutter, film, and parts of the negative-identifying mechanism;

Fig. 5 is a section on the line 5—5 of Fig. 3 looking in the direction of the arrows and showing details of construction of the exposure counter and of the transparent dial of the negative-identifying mechanism;

Fig. 6 is a section taken on the line 6—6 of Fig. 5 looking in the direction of the arrows;

Fig. 7 is a plan view on a somewhat enlarged scale of the exposure counter and negative-identifying mechanism and associated parts;

Fig. 8 is a section on an enlarged scale taken on the line 8—8 of Fig. 3 looking in the direction of the arrows and showing details of the negative-identifying mechanism;

Fig. 9 is a section on the line 9—9 of Fig. 6 showing the positions of the indexing pawl and of the stop for the transparent dial, and of the pin, which is adapted to disengage them from the dial, when the rear door of the camera is closed; and Fig. 10 is a section on the same line, but showing the positions of these parts when the rear door of the camera is open and showing how the pin disengages the pawl and stop, enabling the dial to be reset.

Referring now to the drawings by numerals of reference, 20 denotes the camera casing, and 21 the rear door thereof which is shown open but only fragmentarily in Fig. 1. 22 is an objective focusing mount which is removably secured to the camera, and 23 is the front lens thereof. The camera has in its front wall a pair of viewfinder windows 24 and 25 through which light is admitted to the viewfinder and rangefinder systems of the camera. The eyepiece for the viewfinder and rangefinder systems is at the rear of the camera and is denoted at 26 (Fig. 2).

27 is the flash gun socket on which can be mounted a flashlight for use with the camera. 28 is the selector switch for use in flash synchronization; and 29 is the shutter speed setting dial for the camera. These form no part of the present invention, and need not, therefore, be further described here.

Removably mounted in the camera is a chassis denoted as a whole at 45 in Fig. 3. The chassis carries portions of the range-finder mechanism of the camera including the optical prism 50 and the lens 51. These and other parts of the rangefinder system are fully disclosed in my copending application Serial No. 318,231 above mentioned.

The chassis also carries the focal plane shutter of the camera which includes two relatively movable curtains, each of which is secured by means of tapes 55 and 56 (Fig. 3), respectively, at one end to a tension roller and at the opposite end to a geared roller, all as described more completely in my application Serial No. 365,021, above mentioned. The tension roller for the upper or trailing curtain, to which the tapes 55 are fastened, is denoted at 57 (Fig. 4), while the geared roller 58 for this curtain is denoted at 58. The tension roller for the lower or leading curtain is denoted at 59; and the geared roller for this curtain is designated at 60. A spring motor housed in a metering roll 65 serves to drive the shutter through mechanism described in my application Serial No. 365,021, and also serves to drive the winding key 62 (Fig. 3) for the film take-up roll of the camera. When the trigger of the camera is tripped, the shutter runs down, that is, opens, under actuation of the tension rollers 57 and 59 to make an exposure, and then the spring motor is released to rewind the shutter curtains, that is, to recock the shutter, and to actuate the winding key 62 to advance the film, all as described more particularly in application Serial No. 365,021, above mentioned.

The film F moves from a supply roll in the cassette 67 (Fig. 4) to a take-up roll in the cassette 68 across the guide surfaces 70 and 71 (Fig. 3) provided along the upper and lower sides, respectively, of the generally rectangular exposure opening 72 formed by the generally rectangular frame 73.

The frame 73 has a small rectangular opening cut in it in its left-hand upper corner thereof, as denoted at 75. It is through this aperture 75 that the identifying number is projected onto the film to be photographed onto the negative as the open shutter passes across it at the end of an exposure.

The negative-identifying mechanism comprises a transparent dial 80 which is graduated, and which bears, for instance, successive numerals, from —2 to say 50 (Fig. 6) so that all of the exposures on a roll of film can be made. Alternate numerals only have been shown in Fig. 6 for clarity, but preferably successive numerals are inscribed on the dial 80 opposite each of the successive graduations thereof. The dial 35, which is made of "Lucite" or other suitable transparent plastic, is mounted so that its numerals will register successively, as the dial is indexed, with an arcuate window 82 (Figs. 3 and 8) in the optical wedge 50. This window is formed by removing the opaque coating 83 (Fig. 8) from the outside of the optical wedge for the extent of the window. This window aligns with the circular matte glass window 84 which is mounted in the same frame 85 that carries the viewing window 25 (Fig. 1) of the rangefinder-viewfinder system of the camera. Light entering through the circular window 84 passes through the window 82 in the optical wedge and illuminates that numeral on the graduated dial 80 which is in alignment with the window 84. The illuminated numeral is then reflected by a surface-silvered mirror 86 (Fig. 8) through a short focus lens 87 onto a second surface-silvered mirror 88, which is placed at the level of the aperture 75 (Fig. 3), and which reflects the image of the numeral onto the film F, as soon as the shutter in opening registers with aperture 75. Thus, that numeral on the transparent dial 80, which at the moment happens to be opposite the window 84, is photographed onto the portion of the film being exposed, thereby permanently marking the negative for identification.

The mirror 86 is mounted in a bracket 90 and is inclined approximately at 45° to the horizontal. The lens 87 is secured in a shelf 91 of the chassis 45 of the camera. The mirror 88 is mounted in a bracket 92, which is secured to the chassis below the lens 87, and is also inclined approximately 45° to the horizontal.

The graduated transparent dial 80 is adapted to be indexed after each exposure so that the successive negatives exposed in the camera will be numbered successively. The dial is mounted fixedly upon an annular ring 135 (Fig. 5) formed integral with a gear member 136 having face ratchet teeth 100. The hub of this gear member is journaled on a stub shaft 139 which is threaded at its inner end, as denoted at 140, into an upstanding portion of the ledge 93 of the chassis of the camera.

For advancing the dial it is provided with face ratchet teeth 100 (Fig. 6) which are adapted to be engaged by the hooked end 102 of a pawl 103. This pawl is slidable on guide pins 104 which extend through slots 105 in the pawl and which are fastened to the chassis 45. This pawl is normally held in and is constantly urged toward engaged position by a coil spring 106 (Fig. 7) which is wrapped around one of the pins 104 and which is interposed between pawl 103 and a lug 108 into which that pin 104 threads. It is connected by means of a pin 107 with a lever 110, which corresponds to the lever 155 described in my application Serial No. 365,021, above mentioned. This lever is adapted to be rocked back and forth automatically once in each exposure cycle of the camera, as described in said application Serial No. 365,021. Hence, the pawl 103 is reciprocated back and forth once in each exposure cycle of the camera, to advance the dial 80 and to reset the pawl.

The dial 80 is normally held against retrograde movement by a stop dog 115 whose hooked end 116 engages the ratchet teeth 100 of the dial at a point spaced approximately 90° from the point of engagement of the hooked end 102 of the pawl 103. The stop dog is secured at one end by screws 118 to a post 117 formed integral with the ledge 91 of the chassis 45. The stop dog 115 is resilient and is held in and is constantly urged toward engaged position by its own resilience.

The dog 115 and pawl 103 are disengaged from the ratchet teeth 100, to permit return movement of the dial 80, by a pin 120, (Figs. 6, 9, and 10). This pin is threaded at its lower end and mounted by means of its thread in a horizontally movable pin 121 which is mounted to slide in aligned openings 122 and 123 in the ledge 91. A coil spring 124, which surrounds the pin 121 and which is interposed between a wall 126 formed on the ledge 91 at the inside end of the bore 122 and a spring washer 127 which is secured in a groove 128 in the pin 121, serves constantly to press the pin 120 rearwardly in the camera to the position shown in Fig. 10, where it disengages the pawl 103 and stop dog 115 from the ratchet teeth 100 of the dial 80. However, when the camera is in use, the back of the camera is closed and a pin or protuberance 129 carried by the back of the camera engages the end 130 of the pin 121 to force the pin to the position shown in Fig. 9 against the resistance of the spring 124, thereby holding the pin 120 away from the pawl 103 and dog 115 and permitting these members to engage operatively with the teeth 100 of the dial 80.

The teeth 100 of gear 136 mesh with gear teeth 145 formed on a drum 146. This drum is journaled on a stub shaft 147 that is threaded at its inner end, as denoted at 148, into the upstanding portion of the chassis 93 at right angles to the stub shaft 139. The drum 146 carries a graduated ring 150 which constitutes a counter. This counter may be viewed through the clear glass window 152 (Fig. 2) at the right of the eyepiece 26 of the viewfinder-rangefinder system.

Surrounding the hub of the drum 146 and secured at one end to the drum and at its opposite end to a disc 155 (Fig. 5) is a coil spring 156. Disc 155 is held by the shoulder 154 of the stub shaft 147 against rotation. It serves to return the dial 80 to starting position when the pawl 103 (Fig. 6) and dog 115 are disengaged from the dial by the pin 120 (Figs. 9 and 10) upon opening of the door 21 of the camera. A pin 157 (Fig. 5) serves to limit the return movement of the dial by engagement with a pin 158 (Fig. 6) which projects rearwardly thereof.

The operation of the counter and negative identifying mechanism of the present invention will be understood from the preceding decsription, but may be briefly summed up here. When the trigger of the camera is tripped, the tension rolers 57 and 59 (Fig. 4) are released, opening the shutter as described in my application above mentioned. As the slit-opening in the shutter passes aperture 75 (Fig. 3) the numeral on dial 80, which is opposite window 84, is protographed onto the portion of the film that is in picture-taking position. The spring motor then recocks the shutter and advances the film as described in my application Serial No. 365,021. Near the end of each exposure cycle, the lever 110 (Fig. 7) is also rocked first in one direction and then in the other about its axis 156, through operation of pin 158, the spring motor, and the mechanism driven thereby as described in my application Serial No. 365,021 above mentioned. This reciprocates pawl 103 causing the dial 80 to be advanced and pawl 103 to subsequently be reset, and also causing counter 150 to be advanced. Thus, the next numeral on dial 80 is brought into position to be photographed onto the film on the next exposure, and at the same time the counter is advanced. By glancing at the counter dial 150 through window 152 (Fig. 2) the photographer can at any time tell just how many exposures have been made on a roll of film.

While the invention has been described in connection with the identification of negatives taken on roll film it will be understood that it may be used also in cameras for exposing sheet film, and plates. It will be understood, also, that while the invention has been shown as employed in a camera having means, such as a spring motor, for advancing the film after each exposure, it can be used in a camera with means for manually advancing the film or in fact with any means for actuating pawl 103 after each exposure.

While the invention has been described, then, in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A photographic camera comprising a casing, a window in said casing, an exposure frame in said casing and having a principal aperture for framing the picture to be taken and an auxiliary aperture through which an identifying numeral may be photographed on the film exposed, means for supporting a film supply roll at one side of said frame, means for supporting a film take-up roll at the opposite side of said frame, means for rotating said take-up roll to advance the film, a rotary, graduated dial having identifying numerals thereon denoting the number of exposures, a ratchet wheel connected to said dial, a pawl engaged with said ratchet wheel to advance said ratchet wheel and said dial step-by-step, and means operatively connecting said pawl to the means for rotating the take-up roll to actuate said pawl upon rotation of the take-up roll, thereby to advance said dial a step each time the film is advanced to bring successive identifying numerals of the dial successively into position to register on the film through said auxiliary aperture, a stop member for holding said dial against retrograde movement, a door for said casing, means operatively connected to said door to disengage said pawl and said stop member from said dial on opening of said door, and means for resetting said dial to its starting position on disengagement of the stop member therefrom.

2. A photographic camera comprising a casing, a window in said casing, an exposure frame in said casing and having a principal aperture for framing the picture to be taken and an auxiliary aperture through which an identifying numeral may be photographed on the film exposed, means for supporting a film supply roll at one side of said frame, means for supporting a film take-up roll at the opposite side of said frame, means for rotating said take-up roll to advance the film, a rotary, graduated dial having identifying numerals thereon denoting the number of exposures, a ratchet wheel connected to said dial, a pawl engaged with said ratchet wheel to advance said ratchet wheel and said dial step-by-step, and means operatively connecting said pawl to the means for rotating the take-up roll to actuate said pawl upon rotation of the take-up roll, thereby to advance said dial a step each time the film is advanced to bring successive identifying numerals of the dial successively into position to register on the film through said auxiliary aperture, a stop member for holding said dial against retrograde movement, a door for said casing, means operatively connected to said door to disengage said pawl and said stop member from said dial on opening of said door, means for resetting said dial to its starting position on disengagement of the stop member therefrom, and a rotary, graduated counter geared to said dial to be advanced step-by-step with advance of said dial and to return to its starting position upon return rotation of said dial.

References Cited in the file of this patent

UNITED STATES PATENTS

| | | |
|---|---|---|
| 1,420,440 | Moorhouse | June 20, 1922 |
| 1,481,272 | Robertson | Jan. 22, 1924 |
| 2,564,453 | Steiner | Aug. 14, 1951 |
| 2,646,718 | Favre | July 18, 1953 |